United States Patent [19]

Boyce

[11] Patent Number: 5,681,019
[45] Date of Patent: Oct. 28, 1997

[54] BOTTLE HOLDER FOR LIVESTOCK

[76] Inventor: Trent Boyce, 315 N. 3500 East, Lewisville, Id. 83431

[21] Appl. No.: 515,918

[22] Filed: Aug. 16, 1995

[51] Int. Cl.$^6$ ................................................ A47B 96/06
[52] U.S. Cl. .............. 248/229.11; 248/103; 248/229.16; 248/313; 248/316.7
[58] Field of Search ............................ 248/229.11, 311.2, 248/102, 103, 104, 206.2, 206.3, 231.81, 311.3, 313, 229.16, 316.7

[56] References Cited

U.S. PATENT DOCUMENTS

| | | | |
|---|---|---|---|
| D. 217,472 | 5/1970 | Lovitz | D30/13 |
| 789,519 | 5/1905 | Zeisinger | 248/229.16 |
| 1,020,136 | 3/1912 | Feely et al. | 248/103 |
| 1,349,051 | 8/1920 | Dulac | 248/103 |
| 1,407,681 | 2/1922 | Saunders et al. | 248/103 |
| 2,041,332 | 5/1936 | Golden | 248/229.1 |
| 2,074,736 | 3/1937 | Whitten | 248/103 |
| 2,391,264 | 12/1945 | Nickelson | 248/103 |
| 2,444,585 | 7/1948 | Tubiolo | 248/104 |
| 2,457,972 | 1/1949 | Bailey | 248/103 |
| 2,514,134 | 7/1950 | Mann | 248/102 |
| 2,575,056 | 11/1951 | Jones | 248/103 |
| 2,670,165 | 2/1954 | Dominguez | 248/103 |
| 2,772,801 | 12/1956 | Schwortz | 248/102 |
| 2,864,575 | 12/1958 | Stewart | 248/103 |
| 2,888,971 | 6/1959 | Wootton | 151/41.75 |
| 2,896,893 | 7/1959 | Oliver | 248/228.6 |
| 2,912,200 | 11/1959 | Reinhorn | 248/103 |
| 3,836,106 | 9/1974 | Gray | 248/229.26 |
| 3,989,213 | 11/1976 | Allen | 248/231.81 |
| 4,848,714 | 7/1989 | Ziaylek, Jr. et al. | 248/313 |
| 4,979,707 | 12/1990 | McErlean | 248/104 |
| 5,010,847 | 4/1991 | Braden | 119/18 |
| 5,114,108 | 5/1992 | Olschansky | 248/311.2 |
| 5,301,634 | 4/1994 | Ho | 119/18 |
| 5,356,102 | 10/1994 | Blumenaus | 248/205.5 |

FOREIGN PATENT DOCUMENTS

| | | | |
|---|---|---|---|
| 2034799 | 6/1990 | United Kingdom | 248/311.2 |

Primary Examiner—Leslie A. Braun
Assistant Examiner—Anita M. King
Attorney, Agent, or Firm—Thorpe, North and Western, L.L.P.

[57] ABSTRACT

A flexible bottle holder for feeding livestock. The bottle holder includes a main support body configured for supporting a livestock feeding bottle thereon. Opposing side support arms extend upwardly from either side of the support body and are configured to grip the feeding bottle therebetween as the bottle rests upon the support body. A gripping member is coupled to the support body and includes a first wall and a resilient U-shaped member intercoupled with the first wall. The U-shaped member is configured to deflect responsive to contact with the support edge, and is spaced apart from the first wall by a distance which is less than the width of the support edge. When the gripping member is placed upon the support edge, such as over the top of a calf stall wall, the support edge resides sandwiched between the first wall and the U-shaped member in a firm grip.

42 Claims, 3 Drawing Sheets

BOTTLE HOLDER FOR LIVESTOCK

BACKGROUND OF THE INVENTION

1. The Field of the Invention

The present invention relates generally to bottle holders. More particularly, it concerns a deflectably mountable bottle holder for holding a livestock feeding bottle.

2. The Background Art

Various feeding apparatus and methods have been devised for feeding livestock more efficiently. In particular, the dairy industry has found that dairy cattle can be fed more cost effectively by using quick and efficient mechanical feeding methods. Bottle holders have been developed in the dairy industry for mounting a feeding bottle upon the wall of a cattle stall, with the bottle nipple being placed at a conveniently accessible angle and position for the cattle.

Unfortunately, the prior art bottle holders are characterized by a number of disadvantages. They are rigid in structure and are rigidly secured to the wall of the stall. Young calves are naturally inclined to bunt, deflect and otherwise "mother up" to their food source for nurturing, but the rigid bottle holders do not deflect responsively and thereby frustrate such natural tendencies. The conventional bottle holders require labor intensive construction because they are often made of wire which typically requires four or more different bends and a number of different welds. In addition, the structural rigidity prevents a single bottle holder from holding bottles of various sizes.

OBJECTS AND SUMMARY OF THE INVENTION

It is therefore an object of the present invention to provide a bottle holder which is simple in design and manufacture.

It is another object of the invention to provide such a bottle holder which is easier to use.

It is a further objection of the invention to provide such a bottle holder which is capable of more firmly gripping a support edge.

It is an additional object of the invention, in accordance with one aspect thereof, to provide such a bottle holder which has elastic memory.

It is still another object of the invention, in accordance with one aspect thereof, to provide such a bottle holder which has interchangeable parts.

The above objects and others not specifically recited are realized in a specific illustrative embodiment of a flexible bottle holder for feeding livestock. The bottle holder includes a main support body configured for supporting a livestock feeding bottle thereon. Opposing side support arms extend upwardly from either side of the support body and are configured to grip the feeding bottle therebetween as the bottle rests upon the support body. A gripping member is coupled to the support body and includes a first wall and a resilient U-shaped member intercoupled with the first wall. The U-shaped member is configured to deflect responsive to contact with the support edge, and is spaced apart from the first wall by a distance which is less than the width of the support edge. When the gripping member is placed upon the support edge, such as over the top of a calf stall wall, the support edge resides sandwiched between the first wall and the U-shaped member in a firm grip.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED EMBODIMENTS

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the relevant art and possessed of this disclosure, are to be considered within the scope of the invention claimed.

Figure 1:
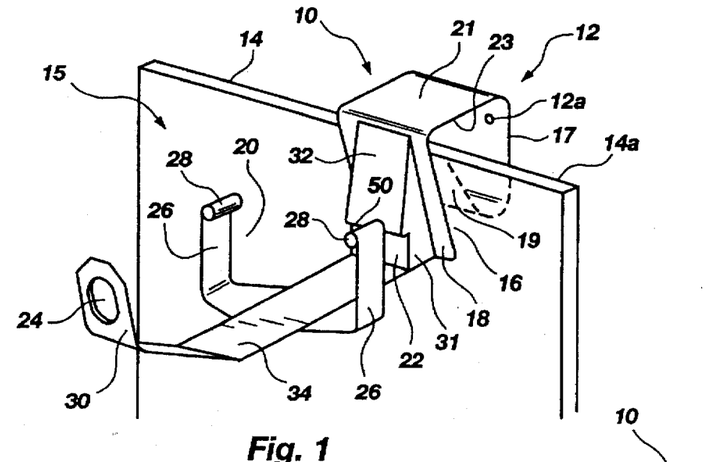
FIG. 1 is a perspective view of a bottle holder made in accordance with the principles of the present invention.

Referring now to FIG. 1, there is shown a bottle holder, generally designated at 10, removably supported upon a suitable support edge 14 such as the top of a cattle stall wall. The bottle holder 10 includes a suitable holding means, such as that designated generally at 15, for releasably holding a feeding bottle (not shown in FIG. 1) having a nipple. A suitable gripping means, such as that designated generally at 12, for releasably gripping a support edge, is coupled to the holding means 15. A preferred embodiment of the gripping means 12 includes first and second opposing walls 17 and 18 intercoupled so as to define a space 16 therebetween and a moveable surface 19 coupled to at least one of the walls and being moveable relative to the walls. The moveable surface 19 is preferably a resilient member intercoupled with the wall 17 so as to extend upwardly into the space 16 such that the resilient member 19 and said wall 17 collectively define a resilient U-shaped member as shown.

The U-shaped member is configured to deflect responsive to contact with the support edge 14, and the resilient member 19 is spaced apart from the wall 18 by a distance which is less than the width of the support edge 14. When the gripping means 12 is placed upon the support edge 14, the support edge resides sandwiched between the wall 18 and the U-shaped member in a firm grip. The entire bottle holder 10 is preferably of a one-piece unitary construction from any suitable elastic memory material, such as injection-molded plastic. The first and second opposing walls 17 and 18 and the moveable surface 19 are thus collectively configured for exerting pressure against opposing surfaces of the support edge 14 when the support edge resides sandwiched between the moveable surface and the wall 18. Alternatively, holes 12a may be provided for permanently fastening the bottle holder 10 with screws or the like.

The first and second opposing walls 17 and 18 are preferably intercoupled by a bridge wall 21 having a substantially flat, planer undersurface 23 facing the space 16 defined between the walls. The flat undersurface 23 is configured to engage against a flat top surface 14a of the support edge 14, with resulting advantage that the bottle holder 10 is positioned more securely thereby.

Figure 2:
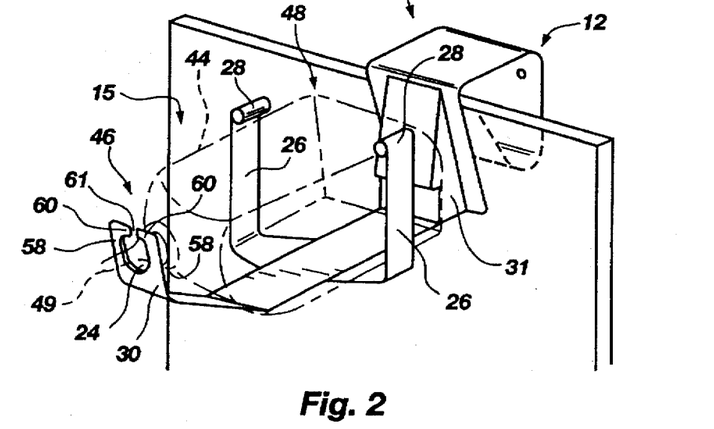
FIG. 2 is a perspective view of an alternative embodiment of the bottle holder of FIG. 1 holding a bottle shown in phantom line.

The bottle holder 10 is configured for holding a feeding bottle shown in FIG. 2 in phantom line at 44, the feeding bottle having a front end portion designated generally at 46 and a rear end portion designated generally at 48. The holding means 15 preferably comprises a main support body 34 configured for supporting the feeding bottle 44 thereon, preferably including front and rear support members 30 and 31 extending upwardly from the support body 34 and being configured for engaging with the front and rear end portions 46 and 48 of the feeding bottle 44, respectively. The bottle 44 (FIG. 2) is received into a bottle recess 20, and a bottle nipple 49 (FIG. 2) protrudes through a nipple aperture 24. The holding means 15 also preferably includes side support arms 26 which cooperate with the front and rear support members 30 and 31 to hold the bottle 44 in a secured, seated position.

The rear support member 31 preferably comprises multi-directional guiding surface means comprised of first and second guiding surfaces 22,32, respectively, for contactably guiding the feeding bottle 44 into the holding means 15 responsive to the feeding bottle being pushed against the multi-directional guiding surface means. Preferably, the first guiding surface 22 operates as a bottle stop and the second guiding surface 32 operates as a directional slide. When the bottle 44 (FIG. 2) enters the bottle recess 20, the rear portion 48 is guided against the second guiding surface 32 to slide conveniently in position against the first guiding surface 22 so that the bottle 44 is conveniently wedged into the holding means 15, instead of being abruptly levered into a rack as in conventional, prior art bottle holders. In this manner, the second guiding surface 32 has an effect similar to a shoe horn.

Figure 3A:
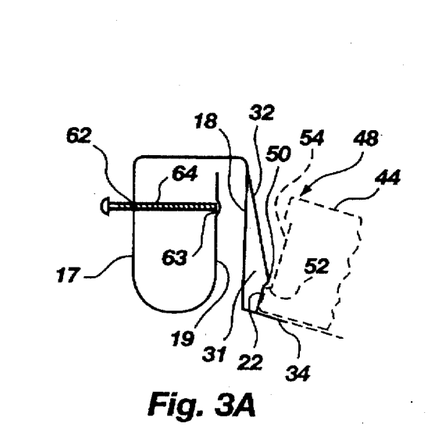
FIG. 3A is a side view an alternative embodiment of a gripping member portion of the bottle holder of FIG. 1, shown as a break-away portion.

The multi-directional guiding surface means is described in more general terms as the first guiding surface 22 extending upwardly from the support body 34 so as to face the front support member 30, and the second guiding surface 32 extending upwardly from the first guiding surface 22 at an angle relative to the first guiding surface such that the second guiding surface extends in a direction away from said front support member 30. The second guiding surface 32 forms a junction with the first guiding surface, and a locking knob 50 is preferably formed substantially at the junction. As shown in FIG. 3A, the locking knob 50 is useful to lockably snap around a lip 52 and into a recess 54 formed in the rear end portion 48 of the feeding bottle 44. The locking knob 50 thereby engages with the lip 52 to inhibit movement of the feeding bottle 44 away from the main support body 34.

Figure 5:
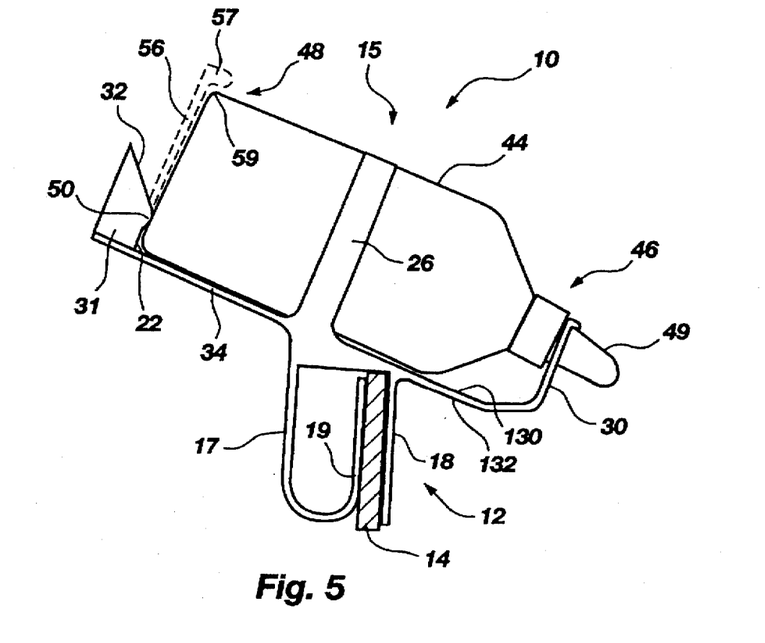
FIG. 5 is a side view of an alternative embodiment of the bottle holder of FIG. 1.

Referring now to FIG. 5, the bottle holder 10 may alternatively include a deflectable guiding surface 56. The deflectable guiding surface 56 has elastic memory and is deflectable relative to the first guiding surface 22 responsive to the feeding bottle 44 being pushed against the deflectable guiding surface. An optional knob 57 may be coupled to the upper end of the guiding surface for engagement around an edge 59 of the feeding bottle.

FIG. 2 illustrates an alternative embodiment of the front support member 30. As illustrated therein, the front support member 30 includes first and second upwardly-extending retaining fingers 58 defining an opening 61. The fingers 58 are configured for respectively engaging with opposing sides of the front end portion of the bottle. The retaining fingers 58 have elastic memory and include (i) opposing upper portions which are separated by a distance that is narrower than the front end portion 46 of the feeding bottle and (ii) opposing lower portions separated by a distance that is wider than the front end portion of the feeding bottle. Retaining lips 60 may be coupled to the upper portion of the retaining fingers 58. The opening 61 provides additional ease in placing and removing the feeding bottle 44.

Referring now to FIG. 3A, the bottle holder 10 may comprise suitable pressure means coupled to at least one of the opposing walls 17 and 18 for exerting pressure upon the resilient member 19. For example, the wall 17 may have a threaded hole 62 formed therein and the resilient member 19 may have a dimple 63 formed therein, and a screw member 64 could be threadably engaged within the threaded hole 62 so as to be moveable into the dimple 63 for exerting pressure upon the resilient member 19.

Figure 3B:
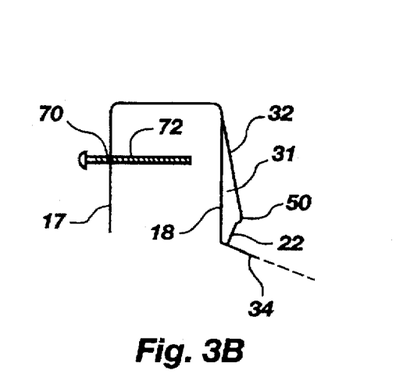
FIG. 3B is a side view of another alternative embodiment of the gripping member of FIG. 1, shown as a break-away portion.

Referring now to FIG. 3B, one of the opposing walls 17 and 18 may include a threaded hole 70 formed therein, and the resilient member 19 (FIGS. 1 and 3A) could be replaced with a moveable surface comprising a screw member 72 threadably engageable within the threaded hole 70 so as to be screwable into the space defined between the walls 17 and 18. The support edge 14 would reside between the screw member 72 and the wall 18, whereby the screw member would be turned to exert pressure upon the support edge to hold the bottle holder 10 in place.

The holding means 15 preferably includes first and second retaining means coupled to the first and second opposing side support arms 26, such as optional knobs 28 configured to engage around opposing edges of the bottle 44 for additional security. The knobs 28 extend inwardly between the side support arms 26. The holding means 15 may also comprise an additional set of side support arms, such as third and fourth opposing side support arms (not shown) configured to grip the feeding bottle 44 therebetween, with third and fourth retaining knobs (also not shown) respectively coupled to the third and fourth retaining arms and extending inwardly between said third and fourth retaining arms. The third and fourth side support arms and retaining knobs would preferably be identical to the arms 26 and associated knobs 28.

There are many alternative embodiments to the knobs 28 which may suitably function as the first and second retaining means coupled to the first and second side support arms 26, in accordance with the principles of the present invention. Some of these alternative embodiments are shown in FIGS. 4A–4F.

Figure 4A:
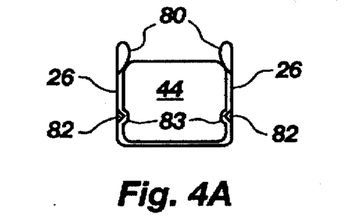
FIG. 4A is a side view of an alternative embodiment of side support arms of the bottle holder of FIG. 1.

Referring now to FIG. 4A, the first and second retaining means comprise first and second deformable loop members 80. Additional retaining members 82 may be coupled to the side support arms 26 for engagement within depressions 83 formed in the feeding bottle 44.

Figure 4B:
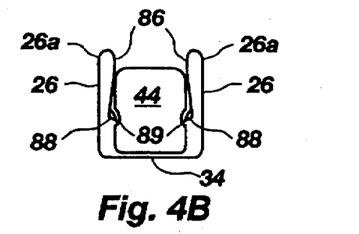
FIG. 4B is a side view of another alternative embodiment of the side support arms of FIG. 1.

Referring now to FIG. 4B, the first and second retaining means comprise first and second resilient arms 86. The side support arms 26 extend upwardly from said main support body and terminate in terminal ends 26a, although the resilient arms 86 extend from the terminal ends 26a toward the main support body 34 in a configuration such that each side support arm 26 and associated resilient arm 86 cooperatively form an upside-down U-shaped member. The terminal ends 26a thus merge into the resilient arms 86. Optionally, each upside-down U-shaped member terminates in a retaining bump 88 for engagement within depressions 89 formed in the feeding bottle 44.

Figure 4C:
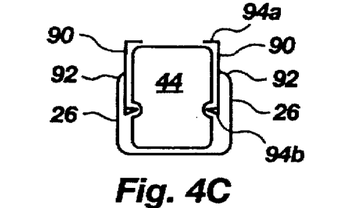
FIG. 4C is a side view of an additional alternative embodiment of the side support arms of FIG. 1.

Referring now to FIG. 4C, the first and second retaining means comprise first and second locking brackets 90. The first and second locking brackets 90 are preferably intercoupled with the side support arms 26 by first and second resilient living hinges 92, respectively. At least one of the locking brackets 90 comprises a bracket body having first and second opposing ends, with first and second retaining edges 94a–94b extending laterally outward from said opposing ends, respectively. The retaining edges 94a–94 b are configured to engage against exterior portions of the feeding bottle 44 in a manner sufficient to inhibit movement of the feeding bottle away from the side support arms 26, as shown in FIG. 4C.

Figure 4D:
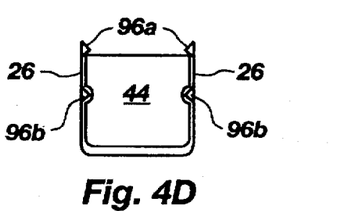
FIG. 4D is a side view of a further alternative embodiment of the side support arms of FIG. 1.

Referring now to FIG. 4D, first and second retaining means each comprise first and second retaining edges 96a–96 b extending laterally outward from the associated side support arm 26 into the space defined between the side support arms.

Figure 4E:
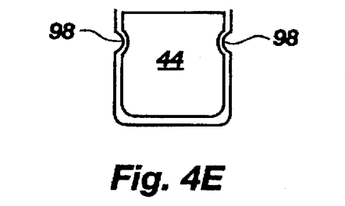
FIG. 4E is a side view of still another alternative embodiment of the side support arms of FIG. 1.

Referring now to FIG. 4E, knobs 98 shown as crescent lip intrusions are formed in the side support arms 26, as alternative embodiments to the knobs 28 of FIG. 1.

Figure 4F:
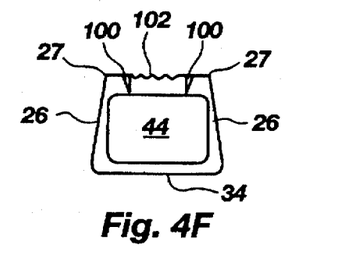
FIG. 4F is a side view of yet another alternative embodiment of the side support arms of FIG. 1.

Referring now to FIG. 4F, the side support arms 26 extend upwardly from the main support body 34 and terminate in terminal ends 27. The first and second retaining means comprise first and second resilient retaining tips 100 respectively coupled to the terminal ends 27 and extending toward the support body 34. A resilient, stretchable member 102 having elastic memory intercouples the first and second resilient retaining tips 100. The retaining tips 100 are spaced from the main support body 34 by a distance which is less than the width of the feeding bottle 44, and the bottle is forced between the tips 100 and the support body 34 to stretchably deform the stretchable member 102. The elastic memory of the stretchable member 102 operates to force the tips 100 against the bottle 44 in a secure holding position.

Figure 6:
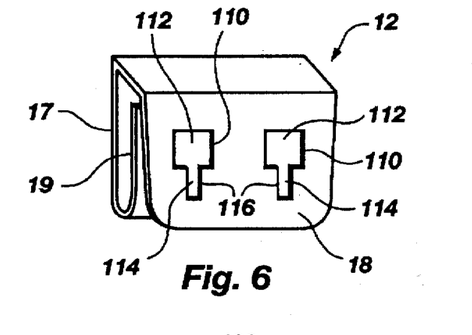
FIG. 6 is another alternative embodiment of the gripping member of FIG. 1, shown as an interchangeable part.
Figure 7:
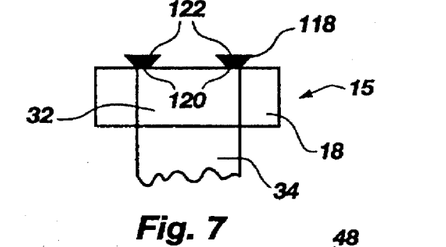
FIG. 7 is a top view of an alternative embodiment of a rear portion of the bottle holder of FIG. 1, designed to engage with the interchangeable gripping member of FIG. 6.

Referring now to FIGS. 6–7, the gripping means 12 may optionally be removably coupled to the holding means 15, one such embodiment therefore being shown herein. It is to be understood that any suitable apparatus and method for removably coupling the gripping means 12 to the holding means 15 is in accordance with the principles of the present invention.

In particular reference to FIG. 6, the second wall 18 of the gripping means 12 may include at least one slot 110 formed therein, but preferably two slots 110. The slots 110 each include an upper, wider portion 112 which extends downwardly to and communicates with a lower, narrower portion 114 of the slot defined by edges 116 of the gripping means. In particular reference to FIG. 7, the bottle holder includes at least one fastening means 118 having a narrower portion 120 coupled to the holding means 115 and extending outwardly from the holding means and terminating in a wider portion 122. Referring now to FIGS. 6–7 collectively, the wider portion 112 of the slot 110 is wider than the wider portion 122 of the fastening means 118, and the narrower portion 114 of the slot 110 is wider than the narrower portion 120 of the fastening means 118 and narrower than the wider portion 122 of the fastening means, such that the fastening means is insertable into the wider portion 112 of the slot and slidable downwardly into the narrower portion 114 of the slot to become disposed in engagement against the edges 116 of the gripping means 12.

Referring now to FIG. 5, the main support body 34 includes an upper surface 130 configured for supporting the feeding bottle 44 thereon, and an under surface 132. The gripping means 12 is coupled to a mid-portion of the under surface 132 such that the under surface extends laterally outward from opposing sides of the gripping means 12 as shown. The feeding bottle 44 thereby resides above the gripping means 12 when held by the holding means 15.

The embodiment of FIG. 5 has been found to be particularly advantageous. Applicant has found that placement of the bottle holder 10 on top of the support edge 14 provides additional simplicity and corresponding time savings in the field of commercial diary cattle production, because the user need not reach over the support edge 14 to place and replace the feeding bottle.

Figure 8:
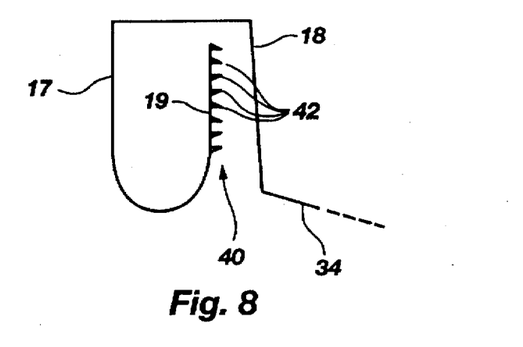
FIG. 8 is a side view of still another alternative embodiment of the gripping member of FIG. 1.

Referring now to FIG. 8, the bottle holder 10 may include suitable gripping structure 40 disposed on the resilient member 19. The gripping structure 40 is configured to engage with the support edge 14 when the support edge resides between the resilient member 19 and the wall 18. One embodiment of the gripping structure 40 includes a plurality of teeth members 42 extending outwardly from the resilient member 19, wherein at least some of said teeth members extend in a different direction than others of the teeth members as in FIG. 8.

A preferred method for securing a feeding bottle with respect to a support edge, in accordance with the principles of the present invention, includes the steps of:

(a) acquiring holding means for releasably holding a feeding bottle having a nipple;

(b) coupling gripping means to the holding means for releasably gripping the support edge, said gripping means including first and second opposing walls intercoupled so as to define a space therebetween and a moveable surface coupled to at least one of the walls and being moveable relative to said walls, wherein the moveable surface and the other of the opposing walls are cooperatively configured and positioned to grip the support edge when said support edge resides therebetween;

(c) placing the gripping means onto the support edge such that said support edge resides gripped between said moveable surface and said other of the opposing walls; and (d) sliding the feeding bottle into the holding means.

Figure 9A:
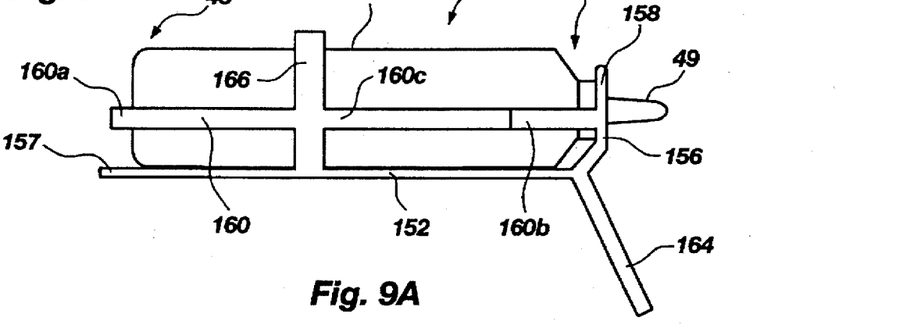
FIG. 9A is a side view of an alternative embodiment of the bottle holder of FIG. 1.
Figure 9B:
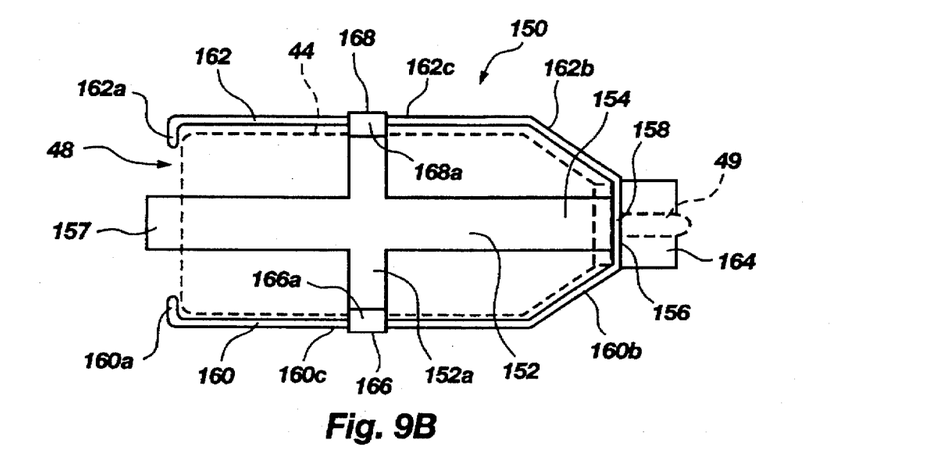
FIG. 9B is a plan view of the bottle holder of FIG. 9A, with a feeding bottle therein shown in phantom line.

Referring now to FIGS. 9A–9B, an alternative embodiment is shown in the form of a bottle holder designated generally at 150. The bottle holder 150 includes a main support body 152 having a front end 154 and a rear end 157. The support body 152 is configured for supporting thereon a feeding bottle 44 having a front portion 46 and a rear end portion 48 (the bottle 44 is shown in phantom line in FIG. 9B). A front support member 156 is coupled to the main support body 152 and is configured for supporting the front portion 46 of the feeding bottle 44, preferably by provision of a nipple aperture 158 through which the bottle nipple 49 may protrude. The front support member 156 may support the front portion 46 of the bottle 44 in other ways, such as by simple abutting contact therewith.

A suitable bottle gripping means is coupled to the support body 152 for gripping the feeding bottle 44, the bottle gripping means preferably including first and second opposing support legs 160 and 162 extending in a direction away from the front support member 156 and terminating in distal ends 160a and 162a. The support legs 160 and 162 are configured and dimensioned to grip the rear end portion 48 of the feeding bottle 44 between them when the front portion 46 of the feeding bottle is being supported by the front support member 156. The distal ends 160a and 162 comprise retaining means respectively coupled to the first and second support legs 160 and 162 which extend inwardly between the support legs for abutting against the rear end portion 48 of the feeding bottle 44.

The distal ends 160a and 162a of the support legs preferably turn inwardly toward each other as shown in FIG. 9B which are spaced apart by a distance that is less than the width of the rear end portion 48 of the feeding bottle 44. The support legs 160 and 162 are preferably parallel to the main support body 152. The distal ends 160a and 162a are configured to seat snugly around the edges of the rear end portion 48 to hold the bottle 44 in place upon the main support member 152.

The support legs 160 and 162 are preferably resilient and respectively include proximal ends 160b and 162b, and middle sections 160c and 162c. The support legs 160 and 162 are coupled at their proximal ends to opposing sides of the front support member 156 and extend toward the rear end 157 of the main support body 152. It is to be understood that although the support legs 160 and 162 as shown in FIGS. 9A–9B extend parallel to the support body 152 and the rear end 157, they are also "extending toward" the rear end 157 as that phrase is intended herein, even though they are not pointing directly toward the rear end 157.

The support body 152 may also include lateral portions 152a. First and second side support arms 166 and 168 extend upwardly from the main support body 152, preferably from the lateral portions 152a, transversely with respect to the support legs 160 and 162 and are respectively coupled to the middle sections 160c and 162c of the support legs. The side support arms 166 and 168 preferably include retaining knobs 166a and 168a in the same configuration of the knobs 28 of FIG. 1.

The configuration of FIGS. 9A–B provides a number of advantages, because the intersection between the support legs and the side support arms may operate as lever points to induce the proximal ends 160b and 162b to flex inwardly against the front portion 46 of the bottle 44 in a firm grip, responsive to the rear end 48 of the feeding bottle forcing the distal ends 160a and 162a outwardly. Put another way, if the distal ends 160a and 162a and their connecting portions are spaced apart less than the width of the bottle 44 at its rear end portion 48 when in their natural unbiased positions, the proximal portions 160b and 162b of the support arms will be forced inwardly toward each other in a lever-type action responsive to the rear end portion 48 of the bottle forcing the distal ends 160a and 162a outwardly. The support legs 160 and 162 may thus be configured and dimensioned to grip the front portion 46 of the bottle when forced inwardly, such that the distal ends 160a and 162 and the proximal ends 160b and 162b cooperatively engage against the bottle 44 when it is placed between the support legs.

A suitable mounting means, such as a mounting bracket 164, is coupled to the main support body 152 for mounting the support body upon a support structure, such as a calf stall. Alternatively, the gripping means 12 of FIG. 1 may be incorporated as part of the bottle holder 150, as may any of the other structures shown in FIGS. 1–8 or described herein. For example, the multi-directional guiding surface means comprising first and second guiding surfaces 22,32 of FIG. 1 may also be incorporated into the bottle holder of FIGS. 9A–9B, preferably by being coupled to the rear end 157 of the main support body 152.

The bottle holders 10 and 150 provide many advantages, especially in the field of dairy cattle production. The profit-making capacity of dairy cattle production depends heavily upon minimizing the time spent feeding the cattle. Many of the prior art bottle holders require extra steps to secure the bottle holder to the stall, and to place and remove the feeding bottle. However, applicant's bottle holders can be placed upon the support edge 14 in a single easy step by simply sliding the gripping means 12 over the edge 14 so that the edge is sandwiched between the wall 18 and the resilient member 19. Further, the multi-directional guiding surface means which includes the second guiding surface 32 operating as a directional slide 32, permits the bottle 44 to be placed into the recess 20 in a single step. The embodiment shown in FIG. 2 with the opening 61 is even easier to use, and there are no structural impediments which require the user to spend time maneuvering the bottle 44 into place. However, it is noted that the embodiment of FIG. 1 is also quite simple to use because although it does not include the opening 61, the feeding bottle nipple will naturally slide through the aperture 24 without additional, time-consuming steps.

The one-piece unibody nature of the bottle holder 10 is preferably achieved by utilization of injection molding processes known in the art. When a suitable polymeric material is used to mold the bottle holder 10, the entire bottle holder 10 is thereby rendered flexibly resilient with elastic memory. This is highly advantageous, because the cattle tend to bunt against the feeding apparatus with tremendous force. The resilient bottle holder 10 is less likely to become broken from such bunting, as opposed to the structurally rigid prior art bottle holders which are less capable of absorbing the tremendous bunting forces.

It will be appreciated that the elastic memory of polymeric material, from which the bottle holder 10 is preferably made, can be further utilized by designing the bottle holder such that the distance between the front support member 30 and the 22 is slightly less than the length of the bottle 44 (excluding the length of the nipple 49), and such that the distance between the opposing knobs 28 is less than the width of the bottle. By such a design, the bottle is effectively "snapped" into place with the rear portion 48 of the bottle seated against the 22 and the front portion 46 of the bottle firmly seated against the front support member 30 with the nipple 49 protruding through the aperture 24. The elastic memory nature of the bottle holder 10 flexibly deforms when the bottle 44 is inserted, after which it tends to return to its natural bias position to thereby secure the bottle 44 in a two-way grip between the front and rear members 30 and 31 and between the side support arms 26. Although the bottle holder 10 is preferably designed to fit a certain sized bottle, the flexibility permits bottles of different sizes to snap into place within the holding means 15. The bottle holding structure (main support body 34, front support member 30, side support arms 26, first guiding 22) are flat slab-like members as opposed to the thin wire members of many prior art bottle holders.

Applicant notes that death rates are much higher for bottle-fed livestock such as dairy cattle or auctioned cattle, because they are usually fed powdered milk instead of natural milk and often develop scours from being denied the nurturing care of their mother. Although no feeding apparatus can substitute for an animal's mother, the flexible nature of the bottle holder 10 provides some nurturing appeal for livestock because of its capacity to deflect responsive to bunting by the livestock. In this manner, the bottle holder 10 is more like the mothers of the animals as compared to the rigid prior art bottle holders, and is less prone to inhibit their natural bunting instincts. The bottle holder 10 thereby aids in reducing the death rates.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A bottle holder comprising:
holding means for releasably holding a feeding bottle having a nipple; and
gripping means coupled to the holding means for releasably gripping a support edge, wherein said gripping means includes a first opposing wall and a second opposing wall intercoupled so as to define a space therebetween and a moveable surface coupled to at least one of the walls and being moveable relative to said walls;
wherein the holding means comprises a bottle rack comprising:
a main support body configured for supporting said feeding bottle thereon; and
a front support member and a rear support member extending upwardly from the support body, wherein the rear support member comprises multi-directional guiding surface means for contactably guiding the feeding bottle into the bottle rack responsive to said feeding bottle being pushed against said multi-directional guiding surface means; and wherein the front support member and the rear support member bias the feeding bottle within the holding means.

2. The bottle holder as defined in claim 1, wherein the first and second opposing walls and the moveable surface of the gripping means are collectively configured for exerting pressure against opposing surfaces of the support edge when said support edge resides between the moveable surface and the other of said walls.

3. The bottle holder as defined in claim 1, wherein the moveable surface comprises a resilient member coupled to at least one of the opposing walls and extending into the space defined between said walls, said moveable surface and the other of the opposing walls being cooperatively configured and positioned to grip the support edge when said support edge resides therebetween.

4. The bottle holder as defined in claim 3, wherein the resilient member is intercoupled with the first opposing wall and extends upwardly into the space such that said resilient member and said first opposing wall collectively define a resilient U-shaped member.

5. The bottle holder as defined in claim 3, further comprising gripping structure disposed on the resilient member, said gripping structure being configured to engage with the support edge when said support edge resides between the resilient member and one of the walls.

6. The bottle holder as defined in claim 5, wherein the gripping structure includes a plurality of teeth members extending outwardly from the resilient member, wherein at least some of said teeth members extend in a different direction than others of said teeth members.

7. The bottle holder as defined in claim 3, further comprising pressure means coupled to said at least one of the opposing walls for exerting pressure upon the resilient member.

8. The bottle holder as defined in claim 1, wherein one of the opposing walls includes a threaded hole formed therein and wherein the moveable surface comprises a screw member threadably engageable within the threaded hole so as to be screwable into the space defined between said walls.

9. The bottle holder as defined in claim 1, wherein the multi-directional guiding surface means includes a first guiding surface extending upwardly from the support body so as to face the front support member and a second guiding surface extending upwardly from the first guiding surface at an angle relative to said first guiding surface such that said second guiding surface extends in a direction away from said front support member.

10. The bottle holder as defined in claim 9, wherein the second guiding surface forms a junction with the first guiding surface, the bottle holder further comprising a locking knob formed substantially at said junction.

11. The bottle holder as defined in claim 1, wherein the multi-directional guiding surface means includes a first guiding surface extending upwardly from the support body so as to face the front support member and a second guiding surface extending upwardly from the first guiding surface, said second guiding surface having elastic memory and being deflectable relative to the first guiding surface responsive to the feeding bottle being pushed against said second guiding surface.

12. The bottle holder as defined in claim 1, wherein the first and second opposing walls are intercoupled by a bridge wall having a substantially flat, planer surface facing the space defined between said walls, said bridge wall being configured to engage at its undersurface against a flat top surface of the support edge to thereby enable a more stable grip of the support edge by the gripping means.

13. The bottle holder as defined in claim 1, wherein the gripping means is removably coupled to the holding means.

14. The bottle holder as defined in claim 13, wherein the second opposing wall of the gripping means includes at least one slot formed therein, said slot having an upper, wider portion which extends downwardly to and communicates with a lower, narrower portion of the slot defined by edges of the gripping means, and wherein the bottle holder includes at least one fastening means having a narrower portion coupled to the holding means and extending outwardly from the holding means and terminating in a wider portion, wherein the wider portion of the slot is wider than the wider portion of the fastening means and wherein the narrower portion of the slot is wider than the narrower portion of the fastening means and narrower than the wider portion of the fastening means, such that said fastening means is insertable into the wider portion of the slot and slidable into the narrower portion of the slot to become disposed in engagement against the edges of the gripping means.

15. The bottle holder as defined in claim 1, said bottle holder being configured for holding a feeding bottle having a front end portion and a rear end portion, wherein the holding means further comprises:
a main support body configured for supporting the feeding bottle thereon;
a front support member and a rear support member extending upwardly from the support body and being configured for engaging with the front and rear end portions of the feeding bottle, wherein the front support member includes a first upwardly-extending retaining finger and a second upwardly-extending retaining finger configured for respectively engaging with opposing sides of a front end portion of the bottle.

16. The bottle holder as defined in claim 15, wherein the first and second retaining fingers have elastic memory and respectively include (i) first and second opposing upper portions which are separated by a first predetermined distance and (ii) first and second opposing lower portions separated by a second predetermined distance.

17. The bottle holder as defined in claim 1, wherein the main support body includes an upper surface configured for supporting the feeding bottle thereon and an under surface, and wherein the gripping means is coupled to a mid-portion of the under surface of the main support body such that said under surface extends laterally outward from opposing sides of the gripping means such that the feeding bottle resides above the gripping means when said feeding bottle is held by the holding means.

18. A bottle holder as defined in claim 1, wherein the holding means and the gripping means collectively comprise a one-piece unibody member made from resilient polymeric material sufficiently configured such that the unibody member is flexibly resilient and has elastic memory.

19. A bottle holder comprising:
holding means for releasably holding a feeding bottle having a nipple; and
gripping means coupled to the holding means for releasably gripping a support edge, wherein said gripping means includes a first opposing wall and a second opposing wall intercoupled so as to define a space therebetween and a moveable surface coupled to at least one of the walls and being moveable relative to said walls;
wherein the holding means comprises a first opposing side support arm and a second opposing side support arm defining a second space therebetween and being configured to grip the feeding bottle therebetween, and first retaining means and second retaining means respectively coupled to the first and second side support arms and extending inwardly between said side support arms for retaining the feeding bottle in the holding means;
wherein at least one of the first and second retaining means comprises a resilient arm;
wherein the holding means further comprises a main support body configured for supporting the feeding bottle thereon and wherein the first and second side support arms extend upwardly from said main support body and terminate in first and second terminal ends, respectively, and wherein the first and second retaining means respectively comprise a first resilient arm and a second resilient arm respectively extending from said first and second terminal ends toward the main support body in a configuration such that each side support arm and associated resilient arm cooperatively form an upside-down U-shaped member.

20. The bottle holder as defined in claim 19, wherein at least one of the retaining means comprises a retaining knob.

21. The bottle holder as defined in claim 20, wherein the holding means further comprises third and fourth opposing side support arms configured to grip the feeding bottle therebetween, the bottle holder further comprising third and fourth retaining knobs respectively coupled to the third and fourth retaining arms and extending inwardly between said third and fourth retaining arms.

22. The bottle holder as defined in claim 19, wherein at least one of the first and second retaining means comprises a deformable loop member.

23. The bottle holder as defined in claim 19, wherein each upside-down U-shaped member terminates in a retaining bump.

24. The bottle holder as defined in claim 19, wherein at least the first retaining means comprises a first retaining edge and a second retaining edge extending laterally outward from the first side support arm into the second space defined between the side support arms.

25. A bottle holder comprising:
holding means for releasably holding a feeding bottle having a nipple; and
gripping means coupled to the holding means for releasably gripping a support edge, wherein said gripping means includes a first opposing wall and a second opposing wall intercoupled so as to define a space therebetween and a moveable surface coupled to at least one of the walls and being moveable relative to said walls;
wherein the holding means comprises a first opposing side support arm and a second opposing side support arm defining a second space therebetween and being configured to grip the feeding bottle therebetween, and first retaining means and second retaining means respectively coupled to the first and second side support arms and extending inwardly between said side support arms for retaining the feeding bottle in the holding means;
wherein at least one of the first and second retaining means comprises a locking bracket.

26. The bottle holder as defined in claim 25, wherein the first and second retaining means comprise first and second locking brackets which are intercoupled with the first and second side support arms by first and second resilient living hinges, respectively.

27. The bottle holder as defined in claim 26, wherein at least one of the locking brackets comprises a bracket body having a first opposing end and a second opposing end and first and second retaining edges extending laterally outward from said first and second opposing ends, respectively, said retaining edges being configured to engage against exterior portions of the feeding bottle in a manner sufficient to inhibit movement of the feeding bottle away from the side support arms.

28. A bottle holder comprising:
holding means for releasably holding a feeding bottle having a nipple; and gripping means coupled to the holding means for releasably gripping a support edge, wherein said gripping means includes a first opposing wall and a second opposing wall intercoupled so as to define a space therebetween and a moveable surface coupled to at least one of the walls and being moveable relative to said walls;

wherein the holding means comprises a first opposing side support arm and a second opposing side support arm defining a second space therebetween and being configured to grip the feeding bottle therebetween, and first retaining means and second retaining means respectively coupled to the first and second side support arms and extending inwardly between said side support arms for retaining the feeding bottle in the holding means;

wherein the holding means further comprises a main support body configured for supporting the feeding bottle thereon and wherein the side support arms extend upwardly from said main support body and terminate in terminal ends, the first and second retaining means comprising:

a first resilient retaining tip and a second resilient retaining tip respectively coupled to the terminal ends of the first and second side support arms and extending toward the support body; and a resilient, stretchable member having elastic memory intercoupling the first and second resilient retaining tips.

29. A bottle holder comprising:

holding means for releasably holding a feeding bottle having a nipple, said holding means including a main support body configured for supporting the feeding bottle thereon and a first opposing side support arm and a second opposing side support arm extending upwardly from said support body so as to define a space therebetween, said side support arms being configured to grip the feeding bottle therebetween;

gripping means coupled to the holding means for releasably gripping a support edge, wherein said gripping means includes a first opposing wall and a second opposing wall intercoupled so as to define a second space therebetween and a moveable resilient member coupled to at least one of the walls and being moveable relative to said walls, said resilient member extending into the space defined between said walls; and front and rear support members extending upwardly from the support body, wherein the rear support member comprises multi-directional guiding surface means for contactably guiding the feeding bottle into the bottle holder responsive to said feeding bottle being pushed against said multi-directional guiding surface means.

30. The bottle holder as defined in claim 29, wherein the multi-directional guiding surface means includes a first guiding surface extending upwardly from the support body so as to face the front support member and a second guiding surface extending upwardly from the first guiding surface at an angle relative to said first guiding surface such that said second guiding surface extends in a direction away from said front support member.

31. The bottle holder as defined in claim 30, wherein the second guiding surface forms a junction with the first guiding surface, the bottle holder further comprising a locking knob formed substantially at said junction.

32. The bottle holder as defined in claim 29, wherein the multi-directional guiding surface means includes a first guiding surface extending upwardly from the support body so as to face the front support member and a second guiding surface extending upwardly from the first guiding surface, said second guiding surface having elastic memory and being deflectable relative to the first guiding surface responsive to the feeding bottle being pushed against said second guiding surface.

33. The bottle holder as defined in claim 29, wherein the gripping means is removably coupled to the holding means.

34. The bottle holder as defined in claim 33, wherein the second wall of the gripping means includes at least one slot formed therein, said slot having an upper, wider portion which extends downwardly to and communicates with a lower, narrower portion of the slot defined by edges of the gripping means, and wherein the bottle holder includes at least one fastening means having a narrower portion coupled to the holding means and extending outwardly from the holding means and terminating in a wider portion, wherein the wider portion of the slot is wider than the wider portion of the fastening means and wherein the narrower portion of the slot is wider than the narrower portion of the fastening means and narrower than the wider portion of the fastening means, such that said fastening means is insertable into the wider portion of the slot and slidable into the narrower portion of the slot to become disposed in engagement against the edges of the gripping means.

35. The bottle holder as defined in claim 29, said bottle holder being configured for holding a feeding bottle having a front end portion and a rear end portion, wherein the front and rear support members are configured for engaging with the front and rear end portions of the feeding bottle, respectively, said front support member including a first upwardly-extending retaining finger and a second upwardly-extending retaining finger configured for respectively engaging with opposing portions of the front end portion of the bottle.

36. The bottle holder as defined in claim 35, wherein the retaining fingers have elastic memory and include (i) opposing upper portions which are separated by a distance that is narrower than the front end portion of the feeding bottle and (ii) opposing lower portions separated by a distance that is wider than the front end portion of the feeding bottle.

37. The bottle holder as defined in claim 29, wherein the main support body has an upper surface configured for supporting the feeding bottle thereon and an under surface, and wherein the gripping means is coupled to a mid-portion of the under surface of the main support body such that said under surface extends laterally outward from opposing sides of the gripping means such that the feeding bottle resides above the gripping means when said feeding bottle is held by the holding means.

38. A bottle holder comprising:

a main support body having a front end and a rear end, said support body being configured for supporting thereon a feeding bottle having a front portion and a rear end portion;

a front support member coupled to the main support body and being configured for supporting the front portion of the feeding bottle;

bottle gripping means coupled to the support body for gripping the feeding bottle, said bottle gripping means including a first opposing support leg and a second opposing support leg extending in a direction away from the front support member and terminating in first and second distal ends, respectively, said support legs being configured and dimensioned to grip the rear end portion of the feeding bottle between them when the front support member; and mounting means coupled to the main support body for mounting said support body upon a support structure;

wherein the support legs are resilient and each include a proximal end and a middle section, said support legs being coupled at their proximal ends to opposing sides of the front support member and extending toward the rear end of the main support body, wherein the bottle gripping means further comprises first and second side support arms extending upwardly from the main support body transversely with respect to the support legs and being respectively coupled to the middle sections of the first and second support legs.

39. The bottle holder as defined in claim 38, wherein the distal ends of the support legs are spaced apart by a distance which is less than a Width of the rear end portion of the feeding bottle.

40. The bottle holder as defined in claim 38, wherein the bottle gripping means further comprises first and second retaining means respectively coupled to the first and second support legs and extending inwardly between said support legs for abutting against the rear end portion of the feeding bottle.

41. The bottle holder as defined in claim 38, wherein the mounting means comprises gripping means coupled to the main support body for releasably gripping a support edge, wherein said gripping means includes first and second opposing walls intercoupled so as to define a space therebetween and a moveable surface coupled to at least one of the walls and being moveable relative to said walls.

42. A bottle holder comprising:

a main support body having a front end and a rear end, said support body being configured for supporting thereon a feeding bottle having a front portion and a rear end portion;

a front support member coupled to the main support body and being configured for supporting the front portion of the feeding bottle;

bottle gripping means coupled to the support body for gripping the feeding bottle, said bottle gripping means including a first opposing support leg and a second opposing support leg extending in a direction away from the front support member and terminating in first and second distal ends, respectively, said support legs being configured and dimensioned to grip the rear end portion of the feeding bottle between them when the front portion of the feeding bottle is being supported by the front support member; and mounting means coupled to the main support body for mounting said support body upon a support structure; and multi=directional guiding surface means coupled to the rear end of the main support body for contactably guiding the feeding bottle into the bottle holder responsive to said feeding bottle being pushed against said multi-directional guiding surface means.

* * * * *